United States Patent
Hospital et al.

(10) Patent No.: US 7,019,477 B2
(45) Date of Patent: Mar. 28, 2006

(54) METHOD FOR CONTROLLING A WIPER MOTOR

(75) Inventors: Eric Hospital, Chatellerault (FR); James Jackson, Paris (FR)

(73) Assignee: Valeo Systemes d'Essuyage, (FR)

(*) Notice: Subject to any disclaimer, the term of this patent is extended or adjusted under 35 U.S.C. 154(b) by 254 days.

(21) Appl. No.: 10/451,716

(22) PCT Filed: Dec. 20, 2001

(86) PCT No.: PCT/FR01/04139

§ 371 (c)(1),
(2), (4) Date: Jun. 20, 2003

(87) PCT Pub. No.: WO02/49890

PCT Pub. Date: Jun. 27, 2002

(65) Prior Publication Data

US 2004/0075409 A1   Apr. 22, 2004

(30) Foreign Application Priority Data

Dec. 21, 2000   (FR) .................................. 00 17361

(51) Int. Cl.
*H02P 1/00* (2006.01)
*G05B 1/01* (2006.01)
*B60S 1/02* (2006.01)

(52) U.S. Cl. .................. 318/282; 318/286; 318/468; 318/DIG. 2; 15/250.16

(58) Field of Classification Search ............... 318/626, 318/443, 444, 466–469, DIG. 2, 282, 286; 15/250.001, 250.12, 250.13, 250.16

See application file for complete search history.

(56) References Cited

U.S. PATENT DOCUMENTS

| | | | |
|---|---|---|---|
| 4,614,903 A * | 9/1986 | Betsch et al. ............... | 318/443 |
| 4,866,357 A * | 9/1989 | Miller et al. ............... | 318/443 |
| 4,934,014 A | 6/1990 | Yamamoto | |
| 5,276,389 A * | 1/1994 | Levers ....................... | 318/444 |
| 5,285,138 A * | 2/1994 | Okada ......................... | 318/280 |
| 5,506,483 A * | 4/1996 | McCann et al. ............ | 318/444 |
| 5,892,343 A | 4/1999 | Mack et al. | |
| 5,982,123 A * | 11/1999 | Hornung et al. ............ | 318/443 |
| 6,028,408 A * | 2/2000 | Grass ......................... | 318/490 |
| 6,140,785 A | 10/2000 | Hoegler | |

FOREIGN PATENT DOCUMENTS

| | | |
|---|---|---|
| DE | 197 41 630 | 3/1999 |
| EP | 1 034 991 | 9/2000 |

\* cited by examiner

*Primary Examiner*—Marlon T. Fletcher
*Assistant Examiner*—Eduardo Colon Santana
(74) *Attorney, Agent, or Firm*—Young & Basile, P.C.

(57) ABSTRACT

A method for controlling a wiper motor of a wiper device for a motor vehicle windshield. A control unit implements the inventive method and a wiper device for a motor vehicle windshield. The control unit controls an electric motor which powers a wiper blade on a windshield sweeping between two end-of-travel zones. In each end-of-travel zone, there is a software end-of-travel stop which is moved by a predetermined value after each passage on the software stop, the latter always remaining in its test zone, thereby providing self-adaptation of the sweeping limits in time. The invention also enables the detection of the presence of obstacles on the wiper blade path.

15 Claims, 8 Drawing Sheets

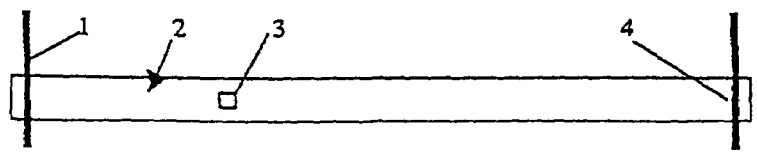
Figure 1a
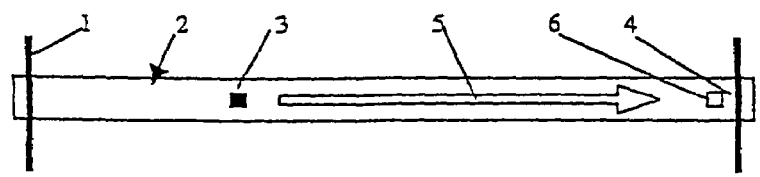
Figure 1b
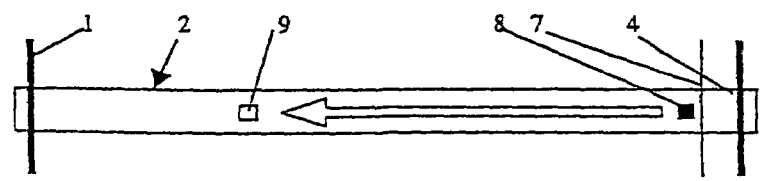
Figure 1c
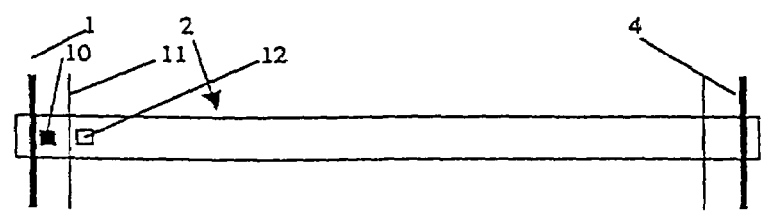
Figure 1d
Figure 3
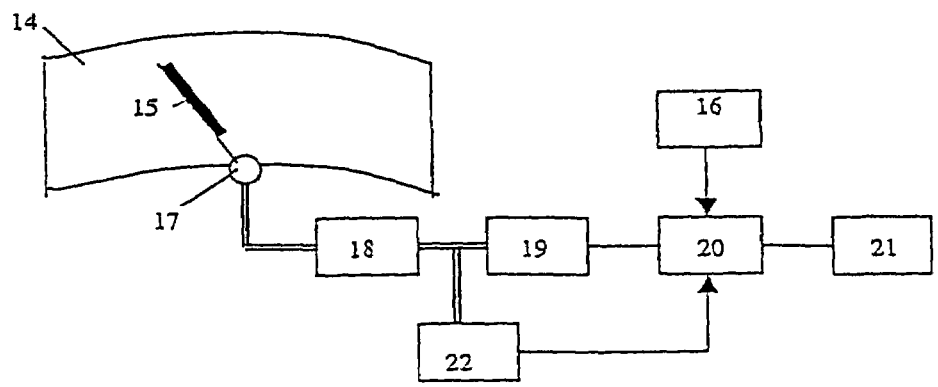

METHOD FOR CONTROLLING A WIPER MOTOR

BACKGROUND

The invention concerns a method for controlling a wiper motor belonging to a wiper device for a motor vehicle windshield.

The invention also concerns a control unit implementing the inventive method and a wiper device for a motor vehicle windshield.

Almost all motor vehicles are equipped with wiping devices comprising at least one wiping element such as a wiper blade. The wiping element allows, via an alternating, rotational or linear sweeping movement, the wiping of a zone of the windshield of a vehicle powered by a continuous current electric motor powered by the battery via control of the driver, by an on-board computer or by other automation.

In a first state of the art, the detection of the ends of the sweeping course was not necessary because they depended on a transformation mechanism, generally of the crank connecting rod type which didn't need position information.

In a second state of the art, the need to control the course of the blade is apparent when one wants to place an electronic control unit between the driver's command or an automated command and the electric motor and today one knows how to detect the instantaneous position of the wiper blade or its docking on the wiping stops. In a certain measure, one also knows how to detect the instantaneous position of the blade in its course and, as a result of predetermined controls, controls the alternating movement by controlling the electric power supply of the electric wiping motor that produces the movement of the blade.

Unfortunately, numerous situations are encountered during use of the motor vehicle on which the wiper device is installed in which the control unit is no longer in a controlled state that corresponds to the real situation.

This is the case in performance or characteristic variations introduced by mechanical play or use, the placement of obstacles on the windshield or in the kinematical chain that transmits mechanical energy from the motor to the wiper blade, and still others, like the intentional displacement by a hand during its wiping path.

In another state of the art, one has proposed means to resolve certain problems occurring during real-life situations. Either it is necessary to re-standardize the system or the wiper device becomes unusable, which is unacceptable from a safety standpoint.

It would be desirable to remedy these inconveniences and to propose a standard wiping device that is simple to install, as well as an automatic initialization process of the command system.

With this goal in mind, the invention proposes a control method of a wiper motor equipped with a wiper device which powers at least one wiper blade moving on a windshield along an alternating path between two end-of-travel positions. The control process is characterized in that:

During a first initialization step,
  to detect the first and second end-of-travel stops, such as those determined by construction of the associated device, then
  to determine from these first and second end-of-travel stops, the first and second end-of-travel test zones and in each of the test zones the position of a software stop on which the blade changes its sweeping direction during normal operation;

during a normal operating step:
  to detect the position of the wiper blade relative to the first and second end-of-travel test zones, in order to determine the change of direction of the sweeping, and
  to provide during at least one passage of the wiper blade in a test zone a variation of the position of the end-of-travel software stop, of the type that provides self-adaptation of the sweeping limits in time with mechanical use, play and other accidents.

According to another aspect of the invention, during the normal operating step, the situation of each end-of-travel test zone is calculated as a function of the detection of the docking of the physical end-of-travel stops.

According to another aspect of the invention, a first limit of each end-of-travel zone is determined based on the detection of the docking of an end-of-travel stop and by a second limit placed at a predetermined distance from the first limit.

According to another aspect of the invention, the variation of the position of each software stop is performed by incrementation of a positive and a negative pitch in such a way so that the software stop stays in its test zone.

According to another aspect of the invention, during normal operation, the control process also consists of detecting the presence of an obstacle on the alternating path of the wiper blade outside of the test zone, when it comes from an end-of-travel test zone, then to determine a wiper stop.

According to another aspect of the invention, during normal operation, the control process also comprises controlling a reverse return of the wiper blade from a predetermined distance, then a stop of a predetermined duration, and finally a return towards the position of the obstacle, at least a predetermined number of times.

According to another aspect of the invention, during normal operation, the control process also controls, from the detection stop position of an obstacle returning behind the wiper blade towards the end-of-travel test zone where the blade began.

According to another aspect of the invention, during normal operation, the control process also consists of controlling next an initialization step, so that the obstacle placed in the path of the wiper blade is considered a physical end-of-travel stop and allows a sweeping step of normal functioning according to graded amplitude.

According to another aspect of the invention, during normal operation, the control process also consists of detecting the presence of an obstacle in an end-of-travel zone, then to produce a stop sweeping command, then a return in the opposite sweeping direction.

According to another aspect of the invention, the control process also consists of incrementing an obstacle detection counter in an end-of-travel test zone, then to detect when the counter reaches a predetermined value, then to re-execute a new initialization step.

The invention also concerns a wiper control unit in order to put in place the control process defined above. The wiper control unit comprises:
  means for determining an end-of-travel test zone at a first sweeping end the input of which is connected to a means of detecting the docking of the wiper blade on a physical end-of-travel stop;
  means for determining an end-of-travel test zone at a second sweeping end the input of which is connected to a means of detecting the docking of the wiper blade on a physical end-of-travel stop;

means for determining the position of an end-of-travel stop in each end-of-travel zone; and means for controlling the movement of a wiper motor;

so that the sweeping direction is reversed during each docking of a software end-of-travel stop and so that the position of each software end-of-travel stop is varied, at the end of determined sweeping, in order for the software end-of-travel stop to stay inside the test zone.

According to another aspect of the invention, the control unit also comprises means for detecting the presence of an obstacle outside of an end-of-travel test zone, the output signal of which is transmitted to the activation input of a generator that comprises, separately or together; means of controlling the reverse return of the wiper blade from a predetermined distance, a means of controlling the reverse return of the wiper blade up to the preceding software end-of-travel stop, means producing a stop time of a predetermined duration, then a return towards the detected position of the obstacle, a counter of the detected number of obstacles from an intermediate stop position producing an active output signal when the detected number surpasses a predetermined value, so that the control means of a reverse return of the wiper blade up to the preceding software end-of-travel stop is activated, the counter thus being reset, a counter of the number of detected of a obstacle in an end-of-travel test zone, producing an active output signal when the detected number surpasses a predetermined value, so that at least one of the means for determining an end-of-travel test zone and one software end-of-travel stop are activated by taking the position of the obstacle as the end-of-travel stop.

According to another aspect of the invention, the control unit also comprises means for detecting the presence of an obstacle in the end-of-travel test zone, the output signal of which is transmitted to the activation input of a generator that controls a reverse return towards the opposite end-of-travel test zone.

According to another aspect of the invention, the control unit also comprises a means for counting the number of sweeps, during the course of which an obstacle was encountered, then when a predetermined number of sweeps has been reached, for recalculating the situation of the end-of-travel test zone in which an obstacle was detected.

The invention also concerns a wiper device incorporating a wiper control unit defined above. The wiper device comprises a wiper motor powered under the control of a control device in order to detect a start/stop command from a user or an on-board computer, connected to the said wiper control unit, which also receive signals representative of the right and left physical ends-of-travel such that the relative position and the detection of the obstacle generated by a detection means relative to the output shaft of the wiper motor, mechanically connected to a reductor and to a rotational movement conversion device of the redactor output shaft in sweeping movement applied to at least one wiper blade.

BRIEF DESCRIPTION OF THE DRAWING

Other characteristics and advantages of the invention will appear in the reading of the detailed description that follows and for the comprehension of which one will refer to the attached drawings among which:

FIGS. 1a to 1d represent schematically diverse placements of the alternating path during the adjustment of the first use of a sweeping device according to the invention;

FIG. 3 represents a block schematic of a wiper device incorporating the control device of the invention;

DETAILED DESCRIPTION

Figure 2A:
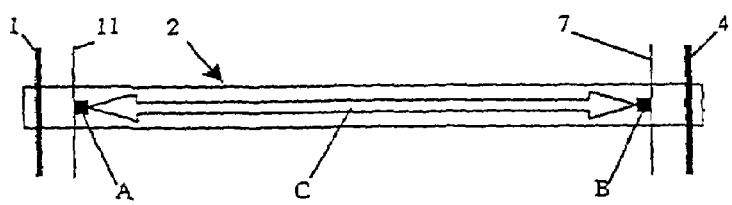
FIGS. 2a to 2e represent schematically different devices of the alternate path during normal operation.

The invention is applied in the same way, whether the wiper device functions with linear sweeping or with oscillating sweeping.

One will describe a system with only one wiper blade even though the invention can also be applied to wiper devices with several wiper blades.

In FIGS. 1A to 1D, one has schematically represented different devices of the alternate path of the wiper blade during the adjustment of the first implementation of a wiper device according to the invention.

The wiper device of the invention such as it is represented in FIG. 3, comprises principally a wiper motor 19 connected to a reductor 18 the output shaft of which is itself connected to a conversion device 17 of rotational movement of the output shaft of the reductor in a sweeping movement applied to the wiper blade 15 on the window 14.

The wiper device of the invention also comprises means 22 for causing a signal representative of the docking of the blade in the end sweeping positions as well as the means of causing a signal representative of the position relative to the blade in relation to a reference point on the sweeping path.

In FIG. 1a, the situation of approaching the end-of-travel, represented on the right by reference number 4 and on the left by reference number 1, can be detected with the aid of end-of-travel stops placed in relation to a turning organ of the motor, of the reductor or also of the rotational movement conversion device in alternating sweeping by the blade.

One has also represented the route or path followed by the blade on the windshield during its wiping operation. This path, represented in FIGS. 1a to 1d by reference number 2, also represents in a production method of the invention, means for producing a signal representative of the instantaneous position relative to the wiper blade in its path relative to a reference point as well as appearing in the following description.

During vehicle service or during reconfiguration phases which will ultimately be described, the wiper device of the invention can see its wiper blade placed in position 3 relative to the physical end-of-travel stop 1 or 4, random on the route or path 2 as well as visible in FIG. 1a.

Figure 6:
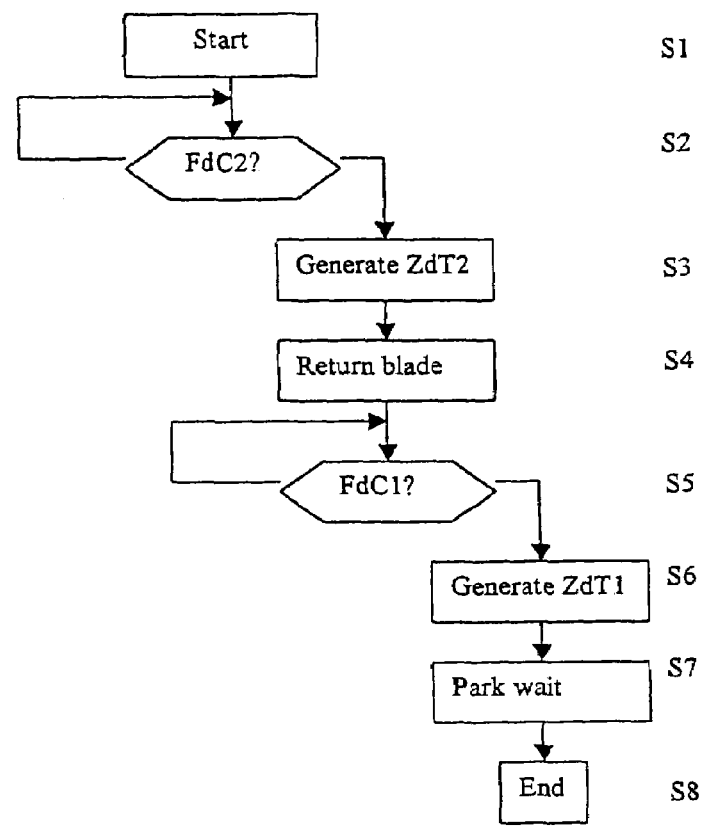
FIGS. 6, 7a and 7b represent flow charts explaining the control process of the invention.

In FIG. 6, one has represented the flowchart explaining the part of the configuration of the control process of the invention, and one describes FIG. 6 in relation to FIGS. 1a and 1d.

At the beginning of the configuration process of the wiper device, during step S1, the control unit 20 (FIG. 3) produces a signal causing the wiper device motor to begin to function for the configuration of the wiper device in such a way so that the wiper blade leaves position 3 in FIG. 1a towards the right physical end-of-travel stop represented to the right 4 of FIGS. 1a and 1b.

During its path 5 (FIG. 1b), the wiper blade 15 (FIG. 3) crosses the windshield 14 (FIG. 3) in such a way so that it attains position 6 in a physical end-of-travel stop 4 (FIG. 1b) situation.

Returning to FIG. 6, during the path 5 of FIG. 1b, according to the process of the invention, the detection of the right end-of-travel stop ("FdC2") is performed by a test S2 that produces the comparison of the relative position 6 of the wiper blade 15 (FIG. 3) in reference to FdC2 of the physical end-of-travel stop 4, to the right.

When the test S2 is positive, the process of the invention passes to step S3 during which the control unit 20 (FIG. 3) generates on the memory means variables defining a test zone ZdT2, said second end-of-travel test zone. At this end, the process of the invention consists of controlling a return of the wiper blade returning towards the left (see FIG. 1c) until in position 8 which borders the left limit (7) in FIG. 1c of the second test zone ZdT2.

During step S4, the control unit 20 (FIG. 3) produces a signal to control the return of the wiper blade that returns to position 9 towards the other physical end-of-travel stop 1 in reference to FIG. 1c.

Returning to FIG. 6, during the path 9 of the FIG. 1c, according to the process of the invention, the detection of the left end-of-travel stop ("FdC1") is produced via test S5 which produces the comparison of the relative position 10 of the wiper blade 15 (FIG. 3) in reference to FdC1 of the physical end-of-travel stop 1, to the left.

When test S5 is positive, the process of the invention passes to step S6 during which the control unit 20 (FIG. 3) generates on memory means variables defining a test zone ZdT1 said first end-of-travel test zone. To this end, the process of the invention consists of controlling the return of the wiper blade by returning towards the right (see FIG. 1D) until in the position 12 which border the right limit 11 of FIG. 1d of test zone ZdT1.

The wiper blade is finally placed in a parked position 12 during step S7 (FIG. 6) and the control process of the invention, in each configuration phase is stopped as much as an order to start the wiper device doesn't perform.

One thus places at the ends of the wiper path, and in the case of a wiper system with several blades, for each wiper blade, two end-of-travel test zones ZdT1 and ZdT2 which are only limited on only one side by the physical end-of-travel stops imposed by the construction of the wiper system.

Finally the wiper blade is parked, before normal vehicle operation, in a waiting position strictly determined in relation to these two test zones.

During normal operation, the dashboard or computer produces a signal beginning the wiper system, and the control device of the invention, by its means of producing a signal representative of the position of the blade, produces at each instant a signal informing the control unit 20 of the fact that it's entering or not in one or another of two end-of-travel test zones ZdT1 or ZdT2.

Figure 7A:
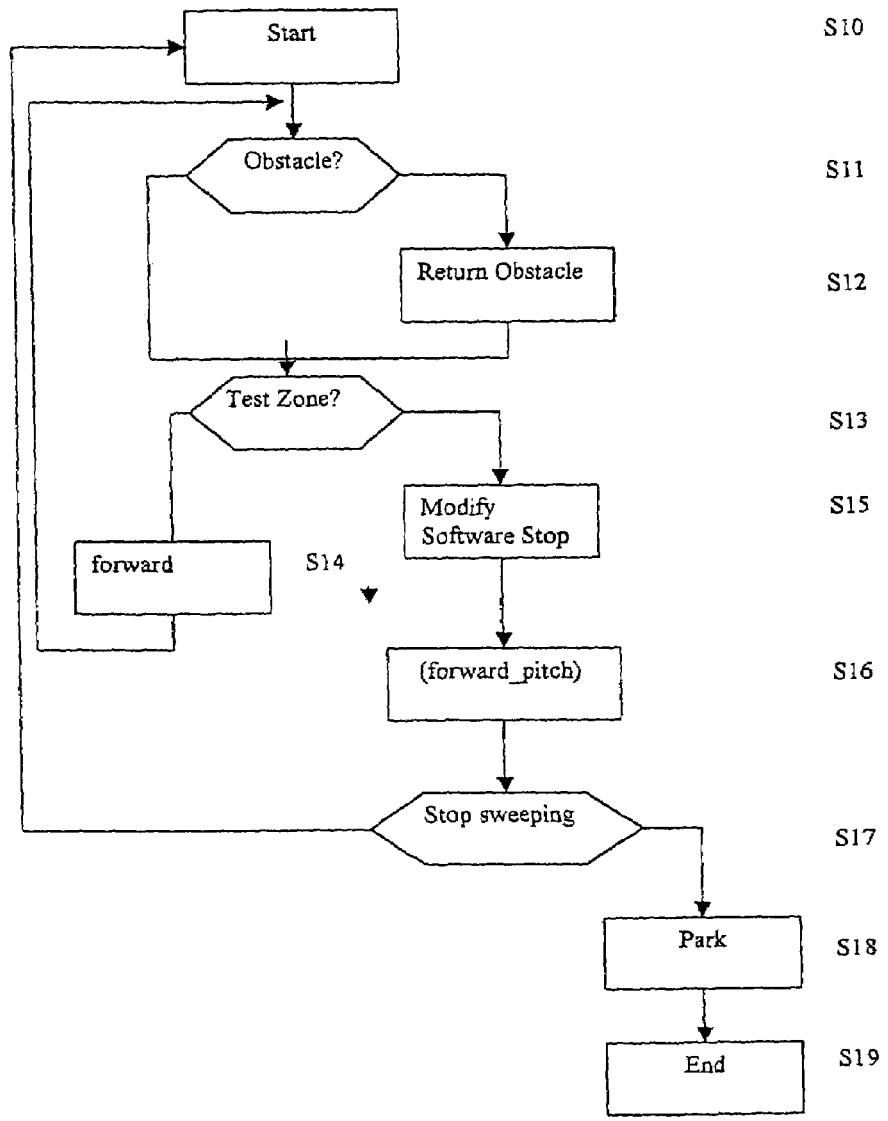

With the aid of the flowchart in FIG. 7a and the drawings in FIGS. 2a to 2e, one is now going to describe the normal operation of the control device of the invention.

In FIGS. 2a to 2e, the elements of the invention having the same function as that as in FIGS. 1a to 1d, bearing the same reference numbers.

During the reception of a start order of the wiper system received by the device control unit of the invention during step S10 (FIG. 7a), the control unit of the invention determines the sweeping direction route as a function of the previous state of the latter.

During step S11, one realizes the detection of an obstacle on the path or course C (in FIGS. 2a to 2e) of the wiper blade in its trajectory on the windshield.

In FIG. 2a, the path of the blade performs between position A, for example initial, in a first situation in relation to the first end-of-travel test zone (ZdT1), between positions 1 and 11, until position B itself in a second position in relation to the second end-of-travel zone (ZdT2), between positions 7 and 4.

Points A and B of the software end-of-travel are established by the control unit 20 of the control device of the invention, and their situations in relation to the first and second end-of-travel zones, respectively, (ZdT1 or ZdT2) are varied at least during certain sweepings or during all the sweeping in normal operation.

To this end, in the case where no obstacle has been encountered or in the case, where, during step S12, the case of an obstacle encountered was treated, the control unit of the invention produces the detection of the situation in which the wiper blade enters in a end-of-travel test zone (ZdT1 or ZdT2).

When test S13 (FIG. 7a) isn't positive, the control unit 20 (FIG. 3) produces, during step 14 (FIG. 7a) an advance signal of the wiper device according to the direction of the course of sweeping.

When end-of-travel detection test zone test S13 is positive, the control unit 20 (FIG. 3) executes, during step S15, a modification operation of the software end-of-travel stop in each of the first and second end-of-travel zones ZdT1 or ZdT2.

Figure 2B:
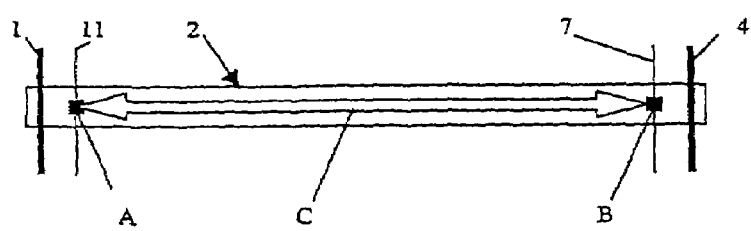

In FIG. 2b relative to the second sweeping path, one notes that the end situations A and B are found inside the test zone in such a way so that the length of the path C increases.

Figure 2C:
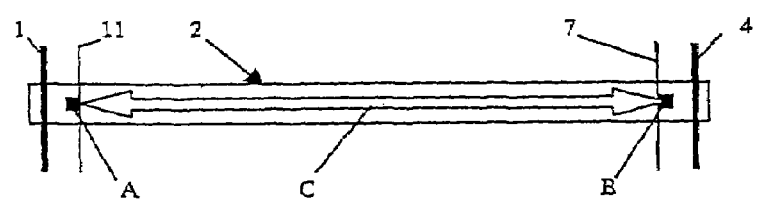
Figure 2D:
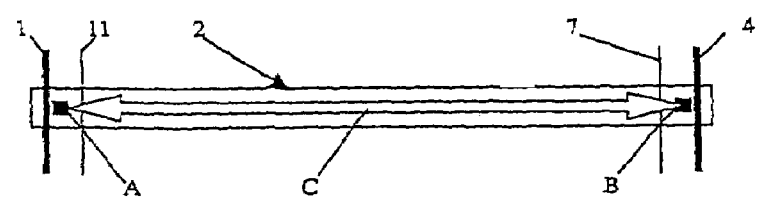

In FIGS. 2c and 2d corresponding to the third and fourth sweeps, the situation of each software end-of-travel stop is placed so that the length of the path of path C measured between two software end-of-travel stops is increased.

The executed control process during the modification step S15 of the situation of the software stop is repeated such that the instantaneous position relative to the wiper blade is not found in concordance with a physical end-of-travel stop to the left 1 or to the right 4.

Figure 7B:
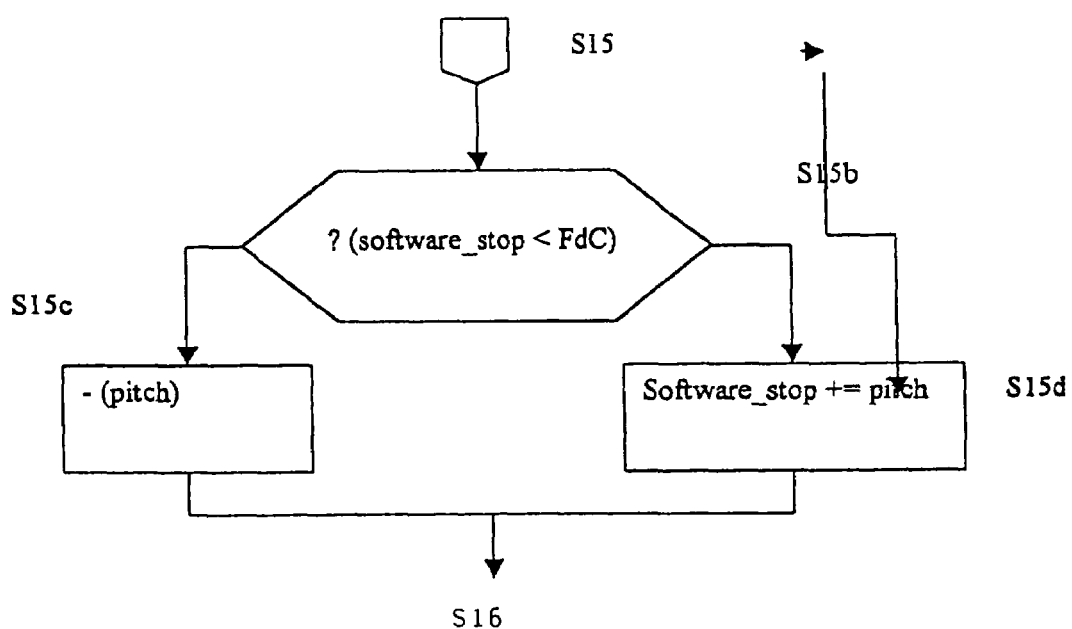

In FIG. 7b, one has represented the detail of operation S15. The operation S15 starts at point S15a of FIG. 7b. From the entry point S15a of the modification operation of the situation of the software stop, one performs during a test S15b the test in order determine if the situation of the software stop reached that of the physical end-of-travel stop.

While the software stop did not achieve the physical end-of-travel stop 1 or 4, the situation of the software stop in the test zone ZdT1 or ZdT2, is incremented by a step determined such that the course of the blade is incremented.

If the software end-of-travel stop reached the physical end-of-travel stop, the sign of the increment step of the position of the software stop is changed.

At the end of operations S15c or S15d, the control is returned to step S16.

Coming back to FIG. 7a, after the modification of the situation of the software end-of-travel stop as well as in the first (Zdt1) as in the second (ZdT2) end-of-travel test zone, the control unit 20 (FIG. 3) controls for the wiper motor a change of direction of the path for example by changing the sign of the increment (forward_pitch) during step S16.

The parameter (forward_pitch) is used by the control unit 20 (FIG. 3) during step S14 which produces the forward control of the blade on its path C. One notes that all relevant front leads can be envisioned, notably as a function of the geometry of the windshield 15 (FIG. 3), from is physical state (moisture, stains, . . . ), or of control of particular issues of the control organ 16 (FIG. 3).

Figure 2E:
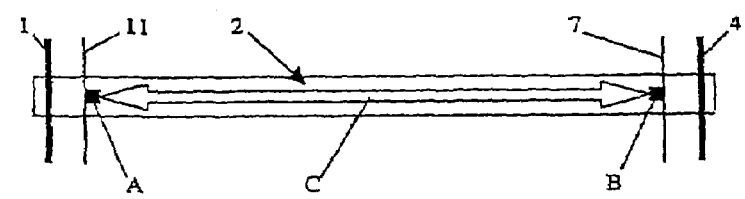

On remarks in FIG. 2e that the amplitude of the sweeping path C is reduced in sweeps that follow that of FIG. 2d, during the course of which the physical end-of-travel stops are achieved by software stops.

One remarks that in the situation of FIGS. 2a to 2e, the makeup of the wiper system of the invention is considered symmetrical.

Now, one of the merits of the invention is to allow, as a result of the use of mechanical pieces, as a result of the non-homogenous state on the entire path of the wiped windshield and finally as a result of play that modifies the wiper mechanism, the positions of the software end-of-travel stops to change, without the wiper system being affected.

In such a real situation, the absolute positions of the software end-of-travel stops in each of the left and right end-of-travel test zones are not symmetrical.

This is a merit of the situation to allow convenient operations even during such a situation.

In order to avoid degradation of the operation of the wiper system, the amplitude of the end-of-travel test zones is determined in order to not hamper driving during wiping, for example, in determining the amplitude for the wiping of a classic motor vehicle windshield of the order of 10 mm.

The flowchart in FIG. 7a follows via step 17 the detection of the sweeping stop produced by an order from the user or onboard computer, in which case, during step S18, the control unit of the invention creates parking of the wiper blade and executes an end step.

While the sweeping is not stopped, the wiper blade follows its path.

In another production method of the control process of the invention, the variation of the position of the software stop in each left ZdT1 1, 11 or right ZdT2 7, 4 test zone is not modified at each sweeping, but at the end of specific sweepings between them. In a production mode not represented in the drawings, the control unit of the invention comprises a counter of the passes in a test zone during normal operation. When the counter achieves a predetermined value, the control unit returns it to the initial state and forces the lead generator of the movement of the wiper blade such that instead of stopping the sweeping in process at the software stop position, the blade achieves the corresponding physical end-of-travel stop. So, the control unit detects that the relative position of the software stop at the physical end-of-travel stop of the test zone considered has changed, the control unit of the invention recharges a new position value relative to the software stop at the physical end-of-travel stop. In a preferred variation, this repositioned position of the software stop is always made at the same distance from the physical end-of-travel stop, for example, ten millimeters.

Figure 4A:
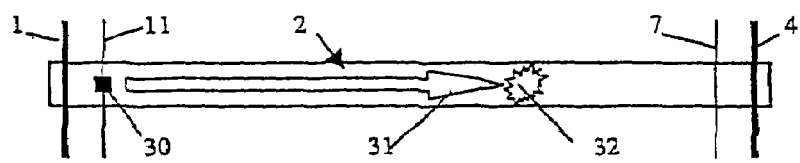
FIGS. 4a to 4c represent schematically different devices of the alternate path during operation, during the course of which an obstacle is encountered.
Figure 4B:
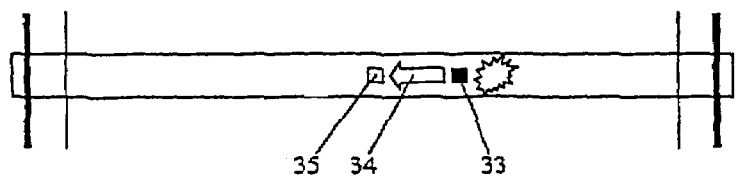
Figure 4C:
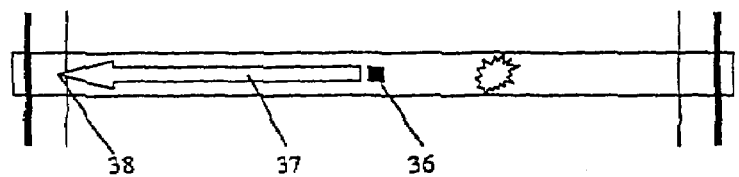

In FIGS. 4a to 4c, one has represented a first situation of an obstacle encountered during an alternating path of the wiper blade.

In FIG. 4a, the wiper blade 15 (FIG. 3), part of position 30 of the first end-of-travel test zone ZdT1 between marks 1 and 11, followed by a path 31 of the normal wiping path on the path 2.

It then encounters an obstacle 32 placed in its path and the control unit 20 (FIG. 3) produces, via means that will be described later, a signal representative of the detection of an obstacle placed in its wiping path.

At the detection of this signal, during step S11 of FIG. 7a, the control unit of the invention produces a signal to reverse sweeping direction such that the blade, stopped in position 33 against the obstacle 32 (FIG. 4b), creates a return path 34.

In a first strategy, the control unit of the invention controls a displacement of the wiper blade until in a waiting position 35 placed at a predetermined distance, for example at an amplitude equal to the amplitude of one of the end-of-travel test zones, 1, 11 or 7, 4.

The control unit 20 (FIG. 3) imposes a stop time then, from position 36 (FIG. 4c) the wiper blade receives a movement in order to try to pass the position of the obstacle 32. If the obstacle 32 has disappeared, the blade returns to its normal wiping path. On the other hand, if the obstacle 32 is encountered again, the control unit of the invention that comprises a counter of the number of detections of the presence of an obstacle like the obstacle 32, produces a signal imposing a return towards the accessible end-of-travel test zone when the counter of the number of detections surpasses a predetermined number, for example five detections.

In a second strategy, the control unit of the invention controls movement of the wiper blade that follows the path 34 in order to return to the other end-of-travel test zone in the situation of a software end-of-travel stop 38.

In the two strategies, if the obstacle detection counter, like obstacle 32, on the windshield registers a number of detections greater than a predetermined number, such as ten, then it imposes the passage of the control unit in a configuration operational step, the obstacle thus serving as a physical end-of-travel stop in order to establish an intermediate test zone and by signaling degraded operation.

Figure 5A:
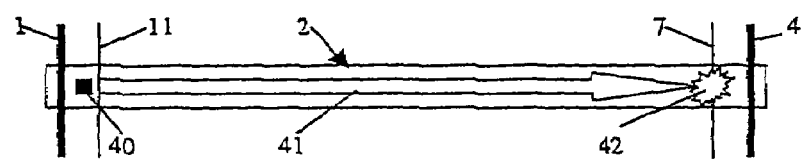
FIGS. 5a and 5b represent schematically devices of the alternate path during operation, during the course of which an obstacle is encountered in an end-of-travel test zone.
Figure 5B:
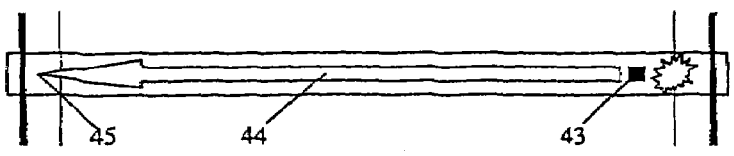

In FIGS. 5a and 5b, one has represented the situation in which the obstacle is found placed in one of the end-of-travel test zones 1, 11 or 7, 4.

In FIG. 5b, one has represented the case where an obstacle 42 is found interposed in the end-of-travel test zone 7, 4.

Leaving the end-of-travel zone in a software stop position 40, the wiper blade follows the path 41 and encounters the obstacle 42 in the second end-of-travel test zone to the right, limited between references 7 and 4.

The control unit 20 (FIG. 3) generates a stop command of sweeping, then a command to change the direction of the path and a return towards the path 44 until the software end-of-travel stop 45 in the other test zone 1, 11.

In the case of an obstacle placed in the test zone to the right or left, the control unit of the invention can produce recalibration, a re-initialization or reconfiguration of the wiping system of the invention for the right end-of-travel test zone.

Figure 9:
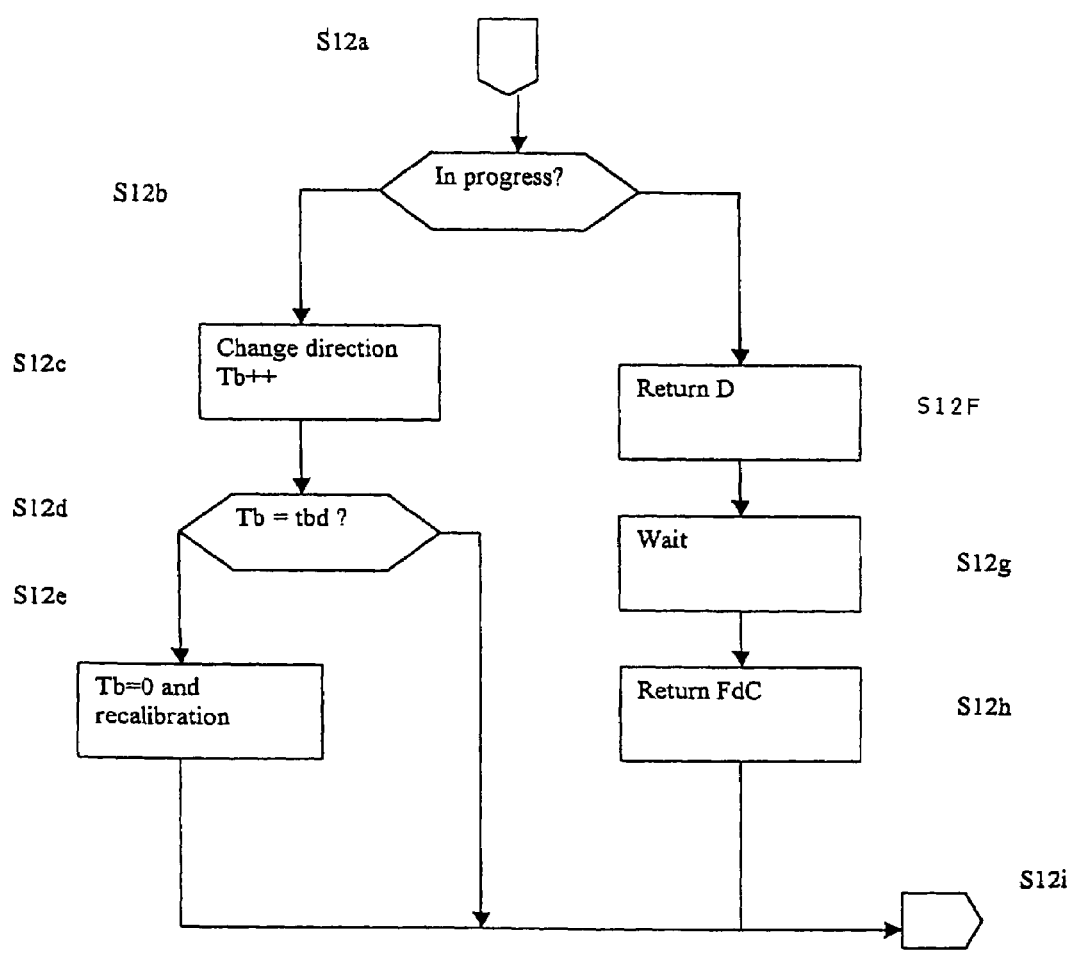
FIG. 9 represents another flow chart explaining the control process according to the invention.

In FIG. 9, one has represented a flowchart representing the said operation, in FIG. 7a, "return obstacle" of step S12.

The entry point of the operation in FIG. 9 is in S12a, then the control unit 20 (FIG. 3) produces during step S12b a test in order to determine if the obstacle is found during the path on the windshield or in one of the first or second end-of-travel test zones.

In the positive case where the obstacle is found during the path of the wiper blade, as one has explained with the aid of FIGS. 4, during step S12f, the control unit generates a return to a predetermined distance D, then a wait delay of a predetermined duration S12g, and finally generates a return towards the end-of-travel test zone FdC during step S12h. The control unit returns the control to point S12i.

If test S12b is negative, during step S12c, the control unit 20 (FIG. 3) produces a command to change the direction of the path of the wiper blade and increments a unit of a variable Tb memorizing the number of sweeps since the variable Tb was initially set at zero during the detection of an obstacle in either the first or second end-of-travel test zones.

During the following step S12d, the control unit determines if the variable Tb memorizing the number of sweeps in detecting an obstacle in the end-of-travel test zone has achieved a reference value TBD in the negative case the control unit returns the control unit to point S12i.

If the number of sweeps during which an obstacle in an end-of-travel test zone has been detected reached the predetermined number of sweeps TBD, the control unit 20 (FIG. 3) puts the variable Tb at the initial value of 0 and executes a recalibration in step S12e at least partially, according to the specification of the flowchart in FIG. 9.

SUMMARY OF THE INVENTION

Figure 8:
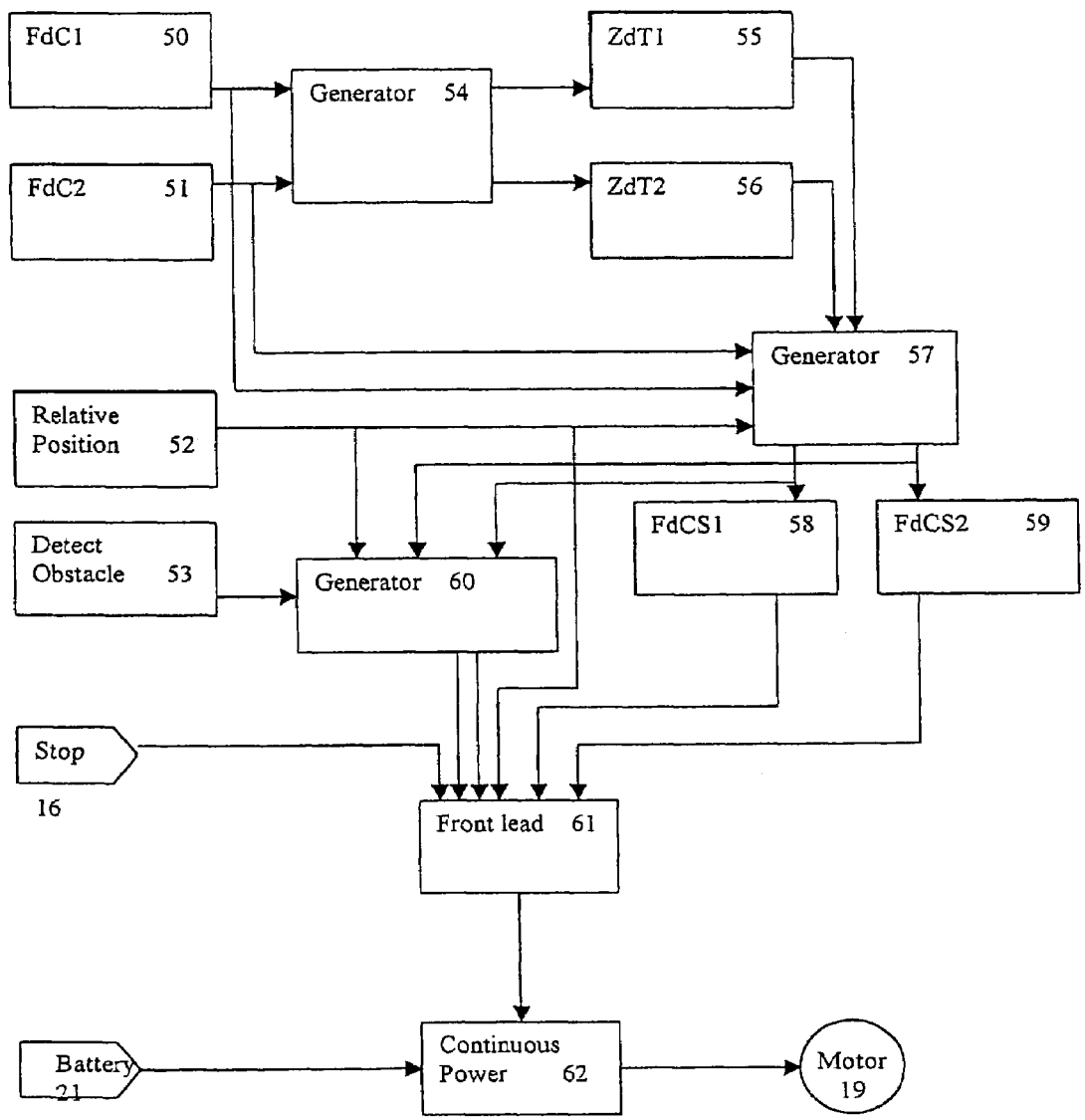
FIG. 8 represents a block schema of a control unit implementing the control process of the invention.

In FIG. 8, one has represented a block schema of a control unit 20 beginning the control process of the invention.

In FIG. 3, one has represented a wiper device using the control unit in FIG. 8 and one has already partially explained it.

A wiper blade 15, in contact with the windshield 14, is driven by a conversion device 17 of rotational movement of the reductor in sweeping, linear or rotational movement, and alternating in the two cases of wiper blades.

The device 17 is mechanically connected to the output shaft of the reductor 18 the input shaft of which is itself connected to the rotor shaft of the induction of a continuous current motor 19 powered across the control unit 20 via continuous tension issued from a battery 21.

The control unit 20 receives from elsewhere a start-stop command issued from a device 16 placed on the dashboard, as well as signals representative of the right and left physical ends-of-travel as well the relative position and the detection of an obstacle generated via a convenient detection means 22.

In FIG. 8, the signals issued from the detection means 22 provide respectively:

means 50 for generating a signal representative of the detection of the docking of the wiper blade on a first physical stop FdC1, means for generating a signal representative of the detection of the docking of the wiper blade on a second physical stop FdC2, means for generating a signal representative of the relative position of the wiper blade on its path on the windshield during wiping, and means 53 for producing a signal detecting an obstacle.

Means 50 and 51 that produce signals representative of the detection of the docking of a right or left physical end-of-travel stops, are connected to the input terminal marker of a configuration generator 54, which is activated only during the configuration or recalibration step of the control process described above.

The generator 54 produces signals that allow configuration of memory means 55 and 56, respectively in order to register the situations relative to the first left ZdT1 and second right ZdT2 end-of-travel test zones in relation to the physical end-of-travel stops FdC1 and FdC2, previously cited.

The signals issued from the memory means 55 and 56 are permanently transmitted to the input terminal markers of a generator 57 producing a lead variation of the situation of the software end-of-travel stops.

The generator 57 also receives on the input terminal markers signals issued from means 50, 51, and 52 respectively:

a signal representative of the detection of the docking of the wiper blade on a first physical stop FdC1, a signal representative of the detection of the docking of the wiper blade on a second physical stop FdC2, a signal representative of the relative position of the wiper blade on its path on the windshield during wiping.

According to the program described with the aid of the flowchart in FIG. 7a, the generator 57 produces on the output terminal markers signals representative of the situation of the software end-of-travel stops in each of the first ZdT1 and second ZdT2 end-of-travel test zones, respectively in reports 58 and 59.

Elsewhere, means 52 and 53 produce signals that represent, respectively, the relative position of the wiper blade in relation to the physical end-of-travel stops and a signal representative of the detection of an obstacle.

The generator 60 operates according to the flowchart described with the aid of FIG. 9. The generator 60 produces output signals that represent the commands for a front lead generator 61 that also receives the start-stop signal from the control device 16 as well as the signal representative of the relative position of the blade and the memory signals representative of the software end-of-travel stops FdC1 and FdC2.

The front lead generator 61 produces a pilot signal addressed to a control power supply circuit 62 placed on the power supply by the battery 21 on the motor 19 in such a way as to make the wiper system operate according to the control process of the invention.

One remarks that the wiping is assured by the indifferent trajectories whether they be circular, if the blade is mounted pivoting or rectilinear, or the blade is mounted on a sliding carriage on a rail.

One remarks that the detection means of an obstacle can be produced by different means comprising the detection of a voltage surge or intensification of the motor power supply 19.

One remarks that the means 52 of producing a signal representative of the relative position of the blade in its sweeping can be produced with the aid of a sensor placed on the motor 19 on its redactor 18 or on an organ linked to the conversion device 17.

Another advantage of the invention is not having to conceive a wiping device for each model of vehicle since, at calibration, its control device produces calibration, and thus, a self-training of the wiping limits characteristic of the vehicle.

Another advantage of the invention is that it is not necessary to place sensors for from the control device or from the electric motor in order to obtain an exact representation of sweeping, which reduces manufacturing costs during mounting on the vehicle and reduces the length of normal electrical cables.

Another advantage of the invention is the creation of self-adaptation to the wiping limits over time as a result of mechanical use, play, and other accidents.

The invention claimed is:

1. A method for controlling a wiper motor equipping a wiper device in order to drive at least one wiper blade moving across a windshield according to an alternating path between a first and second end-of-travel positions, comprising the steps of:

during a first initialization step,
detecting first and second end-of-travel stops such as determined by the construction of the associated wiper device; then
determining from the first and second end-of-travel stops first and second end-of-travel test zones, the first end-of-travel test zone located between the first end-of-travel stop and a distance from the first end-of-travel stop toward the opposing second end-of-travel stop, and the second end-of-travel test zone located between the second end-of-travel stop and a distance from the second end-of-travel stop toward the opposing first end-of-travel stop, and in each of the first and second test zones the position of a software stop on which the blade changes wiping direction in normal operation;

during a normal operation step,
detecting the position of the wiper blade relative to the first and second end-of-travel test zones, in order to determine the change of wiping direction;
realizing during at least one passage of the wiper blade in a test zone, a variation of the position of one end-of-travel software stop of the wiper blade; and
self-adapting of the end-of-travel software stop in relation to path of the wiper blade.

2. The method according to claim 1, characterized in that, during the normal operational step, calculating each end-of-travel test zone as a function of the detection of the docking of the physical end-of-travel stops.

3. The method according to claim 2, characterized in determining a first limit of each end-of-travel zone on the basis of the detection of the docking of an end-of-travel stop and by a second limit placed at a predetermined distance from the first limit.

4. The method according to claim 1 characterized by the step of varying the position of each software stop via incrementation of a positive or negative pitch such that the software stop stays in the test zone.

5. The method according to claim 1, during normal operation, characterized by the further step of detecting the presence of an obstacle on an alternating path of the wiper blade outside of a test zone, while the wiper blade comes from one end-of-travel test zone, then determining a sweeping stop.

6. The method according to claim 5, characterized in the step of controlling a reverse return of the wiper blade from a predetermined distance, then performing a stop of a predetermined duration and returning to the position of the obstacle, at least a predetermined number of times.

7. The method according to claim 5, characterized in the step of controlling, from the stop position of the detection of an obstacle a reverse return of the wiper blade toward the end-of-travel test zone from where the blade came.

8. The method according to claim 1, during normal operation, characterized in detecting the presence of an obstacle in an end-of-travel test zone, then producing a stop sweeping command, then a return in the opposite sweeping direction.

9. The method according to claim 8, characterized in incrementing an obstacle detection counter in an end-of-travel test zone, then detecting when the counter reaches a predetermined value, then executing the first initialization step again.

10. A method for controlling a wiper motor equipping a wiper device in order to drive at least one wiper blade moving across a windshield according to an alternating path between a first and second end-of-travel positions, comprising the steps of:

during a first initialization step,
detecting first and second end-of-travel stops such as determined by the construction of the associated wiper device; then
determining from the first and second end-of-travel stops first and second end-of-travel test zones and in each of the first and second test zones the position of a software stop on which the blade changes wiping direction in normal operation;

during a normal operation step,
detecting the position of the wiper blade relative to the first and second end-of-travel test zones, in order to determine the change of wiping direction;
realization during at least one passage of the wiper blade in a test zone a variation of the position of its end-of-travel software stop such that self-adaptation of the wiping limits is produced in time as a function of forces;
detecting the presence of an obstacle on an alternating path of the wiper blade outside of a test zone, while the wiper blade comes from one end-of-travel test zone, then determining a sweeping stop;
controlling a reverse return of the wiper blade from a predetermined distance, then performing a stop of a predetermined duration and returning to the position of the obstacle, at least a predetermined number of times; and
controlling an initialization step, such that the obstacle placed in the path of the wiper blade is considered as a physical end-of-travel stop and permitting sweeping during the normal operation step according to degraded amplitude.

11. A control unit for controlling a wiper motor carrying a wiper device to drive at least one wiper blade across a surface in an alternating path between first and second end-of-travel positions comprising:

means for determining an end-of-travel test zone at a first sweeping end, located between a physical end-of-travel and a distance from the physical end-of-travel toward an opposing physical end-of-travel, the input of the determining means connected to means for detecting the docking of the wiper blade on the physical end-of-travel stop;

means for determining an end-of-travel test zone at a second sweeping end, located between a physical end-of-travel stop and a distance from the physical end-of-travel toward an opposing physical end-of-travel, the input of which is connected to means for detecting the docking of the wiper blade on the physical end-of-travel stop;

means for determining the position of the end-of-travel stop in each end test zone; and means for controlling the movement of a wiper motor, such that the sweeping direction is reversed during each docking of a software end-of-travel stop and such that the position of each software end-of-travel stop is varied at the end of a determined sweeping, in order for the software end-of-travel stop to stay inside the test zone relative to the associated physical end-of-travel stop.

12. The control unit according to claim 11, characterized as further comprising:
   means for detecting the presence of an obstacle in the end-of-travel test zone, the output signal of which is transmitted to the activation input of a generator that controls a reverse return toward the opposite end-of-travel test zone.

13. The control unit according to claim 12, characterized as further comprising:
   means for counting number of sweepings of the wiper blade during which an obstacle has been encountered, then, when the predetermined number of sweepings has been reached, recalculating the situation of the end-of-travel test zone in which an obstacle has been detected.

14. A wiper device incorporating a wiper control unit according claim 11 characterized as further comprising:
   a wiper motor powered under the control of a control device in order to detect a stop/start command of one of a user and of an on-board computer, connected to the wiper control unit, which also receives signals representative of right and left physical ends-of-travel as well as the relative position and of the detection of an obstacle generated via a detection means in relation to the output shaft of the wiper motor mechanically connected to a redactor and to a conversion device of the rotational movement of the output shaft of the redactor in a sweeping movement applied to at least one wiper blade.

15. A control unit for controlling a wiper motor carrying a wiper device to drive at least one wiper blade across a surface in an alternating path between first and second end-of-travel positions comprising:
   means for determining an end-of-travel test zone at a first sweeping end, the input of which is connected to means for detecting the docking of the wiper blade on a physical end-of-travel stop;
   means for determining an end-of-travel test zone at a second sweeping end, the input of which is connected to means for detecting the docking of the wiper blade on a physical end-of-travel stop;
   means for determining the position of the end-of-travel stop in each end test zone;
   means for controlling the movement of a wiper motor, such that the sweeping direction is reversed during each docking of a software end-of-travel stop and such that the position of each software end-of-travel stop is varied at the end of a determined sweeping, in order for the software end-of-travel stop to stay inside the test zone relative to the associated physical end-of-travel stop; and
   means for detecting the presence of an obstacle outside of an end-of-travel test zone, the output signal of which is transmitted to the activation input of a generator that includes:
      means for controlling a reverse return of the wiper blade from a predetermined distance;
      means for controlling a reverse return of the wiper blade until the preceding software end-of-travel stop;
      means for producing a stop time of a predetermined duration, then a return towards the detected position of the obstacle;
      first counter means for counting the number of detection of an obstacle from an intermediate stop position producing an active output signal when the number of detections surpasses a predetermined value, such that the means for controlling a reverse return of the wiper blade until the preceding software end-of-travel stop is activated;
      the counter means being reinitialized for counting the number of detections of an obstacle from an end-of-travel test zone; and
      producing means for counting an active output signal when the number of detections surpasses a predetermined value, such that at least one of the means of determining an end-of-travel test zone and a software end-of-travel stop are activated by taking the position of the obstacle as end-of-travel stop.

* * * * *